INVENTOR
REINHARD JÄCKLE

United States Patent Office 3,032,669
Patented May 1, 1962

3,032,669
ELECTRIC MOTOR FOR INSTRUMENTS
Reinhard Jäckle, 22 Sommerauer Strasse, St. Georgen,
Black Forest, Germany
Filed Oct. 21, 1959, Ser. No. 847,848
Claims priority, application Germany Oct. 22, 1958
9 Claims. (Cl. 310—154)

The invention relates to electric motors, and more specifically to an electric motor which can preferably be used for the drive of clocks and other electrically driven measuring instruments.

Such motors must, according to the purpose for which they are to be used, have not only a constant number of revolutions but also be constructed to save as much space and weight as possible. It is likewise of primary importance that they have a long life and their current consumption is as low as possible, especially when they are to be driven by a battery.

These requirements are met to a particularly satisfactory degree by an electric motor which, according to the present invention, comprises a permanent core magnet system including an iron pot and a magnet core arranged in the iron pot to produce a magnetic field; at least one non-ferrous coil constituting a rotor and arranged for rotation in the magnetic field of said core magnet system about a shaft; a commutator composed of segments mounted on said shaft of said coil, and brushes on said commutator being connected up with a source of direct current and establishing connection of said source of direct current with said core magnet system.

In a preferred form of construction the iron pot of the core magnet system forms at the same time a housing for the motor and is for this purpose provided with a cover which carries a bearing for the coil shaft projecting through the cover.

This novel type of electric motor, which operates in a fashion similar to the system of a rotary coil measuring instrument, is substantially constant as far as its number of revolutions is concerned, has a very low current consumption and, while giving satisfactory performance, requires little space so that it is particularly suitable for the drive of small clocks.

Figure 1:
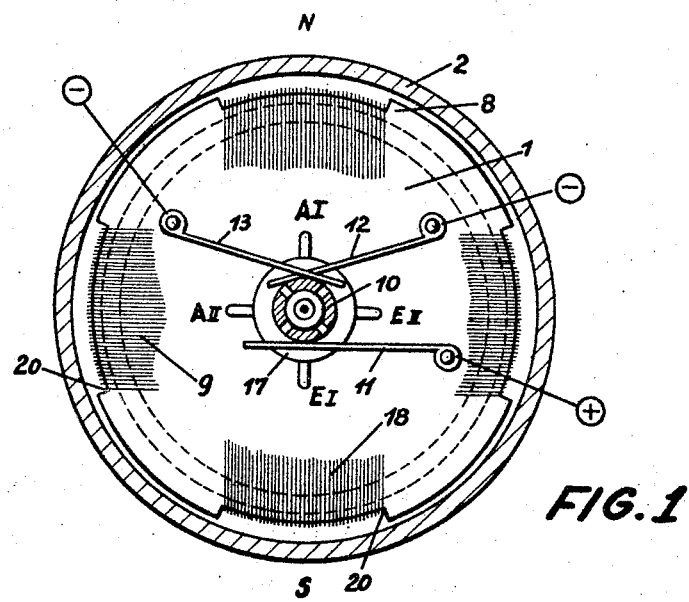
Figure 2:
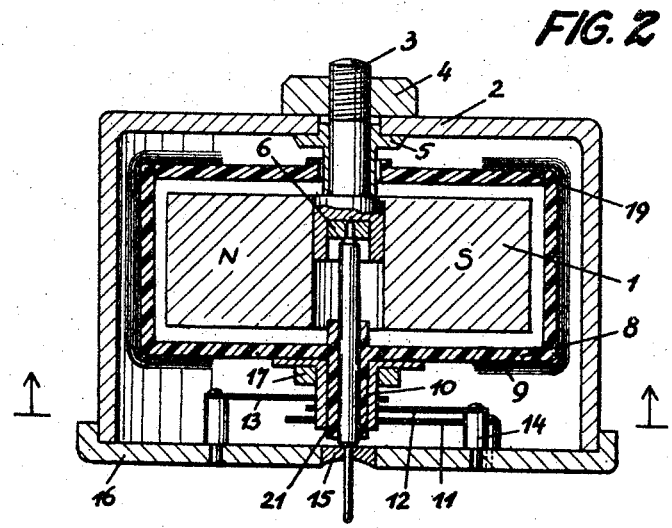

A preferred embodiment of the invention will now be described by way of example, and with reference to the accompanying drawing, in which:

FIG. 1 is a top plan view of an electric motor according to the invention, with removed cover, and FIG. 2 is a central vertical section through the motor.

FIGS. 1 and 2 show a magnet system which serves for producing a permanent magnetic field and consists of a diametrically magnetized cylindrical magnet core 1 which is fixed in an iron pot 2 by means of a screw pin 3 pressed partly into a bore in the magnet core 1 in such a manner that a clearance remains between the magnet core 1 and the bottom of the iron pot 2 as well as the side wall thereof. For this purpose a flanged tube member 5 is secured on the pin 3 between the magnet core 1 and the bottom of the iron pot 2 and the pin 3 is secured to the bottom of the iron pot 2 by means of a nut 4.

In the space between the magnet core 1 and the side wall of the pot 2, one or more, in the present example two coils 9 and 18 are arranged in such a manner that they can turn as rotor about the magnet core 1. The coils 9 and 18 are wound crosswise on a coil carrier 8 having likewise the shape of a pot and preferably made from synthetic plastic material. It will be understood that the center of said pot must be kept free from the coils 9 and 18. The carrier 8 is closed by a cover 19. To enable the coils 9 and 18 to be fixed on the coil carrier 8 in a satisfactory manner, the coil carrier 8 has suitably arranged recesses 20 in which the coils engage.

The coil carrier 8 is rotatably mounted in the iron pot 2 by means of a shaft 7 having special journals at its ends. One of these journals rotates in a bearing bush 6 fitted in the inner end of the pin 3, whereas the other journal, which forms at the same time the drive for a measuring instrument to be driven, projects through a bearing bush 15 which is fitted in a cover 16 which tightly closes the iron pot 2 of the magnet system, which iron pot 2 in the case illustrated forms at the same time the motor housing.

The coils 9 and 18 have their ends connected with four segments 10 of a commutator over which said coils are alternately connected with a source of direct current, not shown in the drawing. The segments 10 are mounted on a sleeve-like extension 21 of the coil carrier 8 which surrounds the shaft 7, and are held on this extension 21 by a clamping ring 17. Cooperating with the segments 10 are three brushes 11, 12 and 13 which are preferably composed of thin resilient wires and are each fixed on the inner side of the housing cover 16 by means of a pin 14 and insulated therefrom.

To obtain a constant flow of current and maximum performance, the brush 11 is connected with the plus lead of the source of current and arranged normal to the direction of the magnetic field, whereas the two other brushes 12 and 13, arranged diametrically opposite the brush 11 and connected with the minus lead of the source of current, overlap the segments in roof-shape and form between them an angle of about 150 to 160°.

The two coils 9 and 18 have their windings so connected up that the beginning and end portions of one coil are always in connection with segments 10 located opposite each other and consequently that coil which is actually in the magnetic field is always under current. By the overlapping of the two brushes 12 and 13, under no circumstances any interruptions can occur in the total passage of current even if segments 10 of the commutator show irregularities.

The invention is evidently not restricted to the example illustrated and described but can be embodied in any other form of construction. Thus, three or more coils may be provided instead of two, and a multipolar permanent magnet arranged as magnet core. In the latter case the coils would have to be wound over the coil carrier as chords.

I claim:

1. An electric motor particularly for driving clocks and other measuring instruments, comprising a permanent core magnet system including an iron pot and a magnet core arranged in the iron pot to produce a magnetic field; at least one coil constituting a rotor and arranged for rotation in the magnetic field of said core magnet system about a shaft, said coil surrounding a non-ferrous pot-shaped coil carrier with a flat bottom and closed with a flat cover and said coil carrier enclosing said magnetic core in radial and axial directions with a predetermined small amount of clearance; a commutator composed of segments mounted on said shaft of said coil, and brushes on said commutator being connected up with a source of direct current and establishing connection of said source of direct current with said core magnet system.

2. An electric motor as set forth in claim 1, wherein the iron pot of the core magnet system is of a one-piece construction and is arranged to form at the same time a housing enclosing the motor, the iron pot being closed by a cover through which one of the ends of the shaft of said coil projects.

3. An electric motor as set forth in claim 1, wherein the coil carrier is formed of synthetic plastic material.

4. An electric motor particularly for driving clocks and other measuring instruments, comprising a permanent core magnet system including an iron pot and a magnet core arranged in the iron pot to produce a magnetic field; at least one non-ferrous coil constituting a rotor and arranged for rotation in the magnetic field of said core magnet system about a shaft; a commutator composed of segments mounted on said shaft of said coil, and brushes on said commutator being connected up with a source of direct current and establishing connection of said source of direct current with said core magnet system, the iron pot of the core magnet system being arranged to form at the same time a housing enclosing the motor and closed by a cover through which one of the ends of the shaft of said coil projects, and the magnet core being fixed in the bottom of the iron pot by a screw pin pressed with one of its ends into a bore in the magnet core, whereas the opposite end of this pin forms a bearing for the opposite end of the shaft of the coil.

5. An electric motor as set forth in claim 3, wherein the segments of the commutator are mounted on a sleeve-like extension of the coil carrier surrounding the shaft of the coil, a clamping ring serving as means for fixing said segments on said extension.

6. An electric motor as set forth in claim 1, wherein the beginning and end portions of the coil and the segments with which they are connected are diametrically opposite each other.

7. An electric motor particularly for driving clocks and other measuring instruments, comprising a permanent core magnet system including an iron pot and a magnet core arranged in the iron pot to produce a magnetic field; at least one non-ferrous coil constituting a rotor and arranged for rotation in the magnetic field of said core magnet system about a shaft; a commutator composed of segments mounted on said shaft of said coil, and brushes on said commutator being connected up with a source of direct current and establishing connection of said source of direct current with said core magnet system, the iron pot of the core magnet system being arranged to form at the same time a housing enclosing the motor with the iron pot being closed by a cover through which one of the ends of the shaft of said coil projects, the brushes being three in number and being provided on the inner side of the housing cover, one brush being connected to the plus lead of the source of direct current and extending normal to the direction of the magnetic field, whereas the other two brushes connected to the minus lead of the source of direct current are arranged opposite the first mentioned brush and overlap the segments in roof-fashion.

8. An electric motor as set forth in claim 7, wherein the overlapping brushes embrace between them an angle of about 150 to 160°.

9. An electric motor particularly for driving clocks and other measuring instruments, comprising a permanent core magnet system including an iron pot and a magnet core arranged in the iron pot to produce a magnetic field; at least one non-ferrous coil constituting a rotor and arranged for rotation in the magnetic field of said core magnet system about a shaft; a commutator composed of segments mounted on said shaft of said coil, and brushes on said commutator being connected up with a source of direct current and establishing connection of said source of direct current with said core magnet system, the iron pot of the core magnet system being arranged to form at the same time a housing enclosing the motor with the iron pot being closed by a cover through which one of the ends of the shaft of said coil projects, the brushes being three in number and being provided on the inner side of the housing cover, one brush being connected to the plus lead of the source of direct current and extending normal to the direction of the magnetic field, whereas the other two brushes connected to the minus lead of the source of direct current are arranged opposite the first mentioned brush and overlap the segments in roof-fashion.

References Cited in the file of this patent

UNITED STATES PATENTS

| | | |
|---|---|---|
| 2,849,630 | Woloff et al. | Aug. 26, 1958 |
| 2,860,267 | Hayes | Nov. 11, 1958 |
| 2,944,169 | Schmidt | July 5, 1960 |

FOREIGN PATENTS

| | | |
|---|---|---|
| 894,422 | France | Mar. 13, 1944 |